United States Patent

Gilg et al.

[11] 4,123,418
[45] Oct. 31, 1978

[54] STABILIZER SYSTEM FOR STABILIZING STYRENE POLYMERS

[75] Inventors: Bernard Gilg, Saint-Louis, France; Helmut Muller, Binningen; Jean Rody, Basel, both of Switzerland

[73] Assignee: Ciba-Geigy Corporation, Ardsley, N.Y.

[21] Appl. No.: 638,125

[22] Filed: Dec. 5, 1975

Related U.S. Application Data

[63] Continuation-in-part of Ser. No. 461,188, Apr. 9, 1974, abandoned.

[30] Foreign Application Priority Data

Apr. 19, 1973 [CH] Switzerland ............... 5753/73

[51] Int. Cl.² ............... C08K 5/34
[52] U.S. Cl. ............... 260/45.8 NT; 260/45.8 N
[58] Field of Search ............... 260/45.85, 45.8 NT, 260/45.95, 45.8 N; 252/404, 407

[56] References Cited

U.S. PATENT DOCUMENTS

| | | | |
|---|---|---|---|
| 3,529,982 | 9/1970 | Luethi et al. | 260/45.9 WC |
| 3,640,928 | 2/1972 | Murayama et al. | 260/45.8 N |
| 3,705,166 | 12/1972 | Murayama et al. | 260/45.8 N |
| 3,734,883 | 5/1973 | Holt | 260/45.8 N |
| 3,745,163 | 7/1973 | Holt et al. | 260/45.8 N |
| 3,759,926 | 9/1973 | Chalmers et al. | 260/45.8 N |
| 3,790,525 | 2/1974 | Murayama et al. | 260/45.8 N |
| 3,828,052 | 8/1974 | Holt et al. | 260/45.8 N |
| 3,847,930 | 11/1974 | Randell et al. | 260/45.8 N |
| 3,853,890 | 12/1974 | Holt | 260/45.8 N |
| 3,884,912 | 5/1975 | Murayama et al. | 260/45.8 N |
| 3,929,804 | 12/1975 | Cook | 260/45.8 N |
| 3,939,168 | 2/1976 | Cook | 260/45.8 N |
| 3,960,809 | 6/1976 | Ramey et al. | 260/45.8 N |
| 4,033,928 | 7/1977 | Randell et al. | 260/45.8 N |
| 4,046,737 | 9/1977 | Holt et al. | 260/45.8 N |

Primary Examiner—V. P. Hoke
Attorney, Agent, or Firm—Vincent J. Cavaleri

[57] ABSTRACT

Stabilizer system consisting of (a) at least one sterically hindered cyclic amine of the formula I

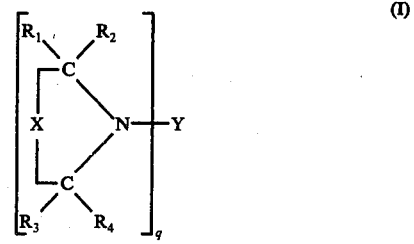

in which $q$ is 1 or 2, X represents an organic grouping which complements the nitrogen-containing ring to give a 5-membered, 6-membered or 7-membered ring, $R_1$ and $R_2$ represent methyl or together represent $-(CH_2)_5-$, $R_3$ represents methyl, $R_4$ represents alkyl with 1-5 carbon atoms or together with $R_3$ represents the radicals $-(CH_2)_4-$, $-(CH_2)_5-$

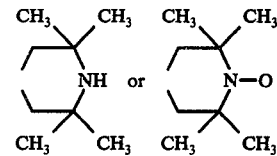

and, if $q$ is 1, Y denotes hydrogen, —O·, hydroxyl, alkyl, substituted akyl, alkenyl, alkinyl, aralkyl, substituted aralkyl or acyl or, if $q$ is 2, Y denotes alkylene, alkenylene, alkinylene, cycloalkylene or aralkylene, and (b) at least one co-stabilizer for stabilizing plastics.

1 Claim, No Drawings

STABILIZER SYSTEM FOR STABILIZING STYRENE POLYMERS

This application is a Continuation-in-Part of parent application Ser. No. 461,188 filed on Apr. 9, 1974, now abandoned.

The present invention relates to a new stabiliser system, the stabilisation of styrene polymers with this new stabiliser system, and the styrene polymers stabilised with this system.

Styrene polymers, especially styrene copolymers such as SAN (styrene-acrylonitrile), ASA (acrylonitrile-styrene-acrylic ester) and above all ABS (acrylonitrile-butadiene-styrene) are increasingly employed, in numerous fields of use, because of their well-balanced mechanical properties and their excellent processing properties. As examples of fields of use there may be mentioned: housings and parts of housings for electrical appliances, internal parts of refrigerators, telephones, heating and ventilating installations, and cladding and coverings for cars. Plastics of this type are also being used increasingly frequently for external applications, for example in boat building, for parts of car bodywork, and for accessories for caravans.

However, an obstacle to the general and broad application of these cheap plastics is their inadequate weathering resistance. For instance, ABS articles show a distinct decrease in their mechanical properties after merely a few weeks weathering in the open.

There has therefore been no lack of attempts to improve the aging resistance of styrene copolymers on weathering in the open. These attempts include, for example, laminating ABS sheets with pigmented and/or UV-stabilised polyacrylate films, the application of protective acrylic resin lacquer top coats or the addition of relatively large amounts of carbon black. A certain degree of weathering resistance can also be achieved by addition of UV absorbers, for example of the benzophenone or benztriazole type.

However, these known methods of improving the aging resistance are not only inadequately effective but also suffer from technical disadvantages. Thus, laminating with protective films is only possible in the case of sheets which, for example, are further converted by the deep-drawing process, and is not applicable to injections mouldings. Surface protection by lacquering requires an additional processing step, which increases the costs. On the other hand, addition of carbon black causes an undesired black colouration of the articles.

Accordingly, a lasting improvement in the weathering resistance by addition of non-staining additives would be technically the ideal solution of the problem since then there would no longer be any restrictions with regard to the colour and processing possibilities of styrene polymers.

A new stabiliser system has now been found, consisting of (a) at least one sterically hindered cyclic amine of the formula I

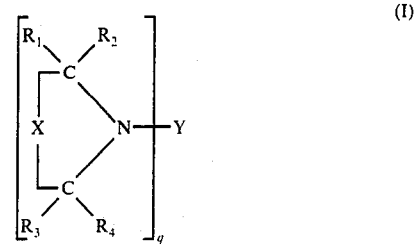

in which $q$ is 1 or 2, X represents an organic grouping which complements the nitrogen-containing ring to give a 5-membered, 6-membered or 7-membered ring, $R_1$ and $R_2$ represent methyl or together represent $-(CH_2)_5-$, $R_3$ represents methyl, $R_4$ represents alkyl with 1–5 carbon atoms or together with $R_3$ represents the radicals $-(CH_2)_4-$, $-(CH_2)_5-$

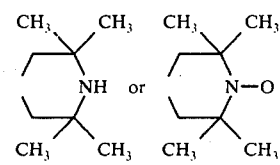

and, if $q$ is 1, Y denotes hydrogen, $-O\cdot$, hydroxyl, alkyl, substituted alkyl, alkenyl, alkinyl, aralkyl, substituted aralkyl or acyl or, if $q$ is 2, Y denotes alkylene, alkenylene, alkinylene, cycloalkylene or aralkylene, and (b) at least one co-stabiliser of the formulae II, III, IV, V, VI, VII or VIII

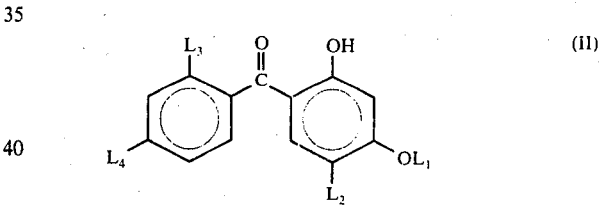

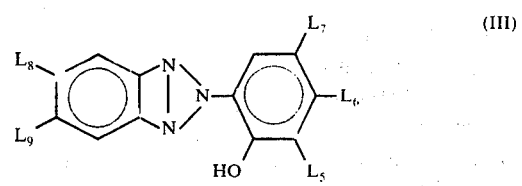

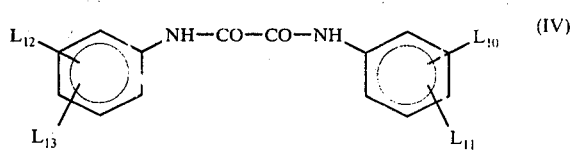

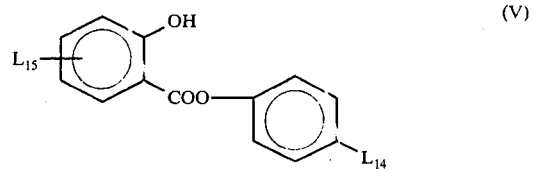

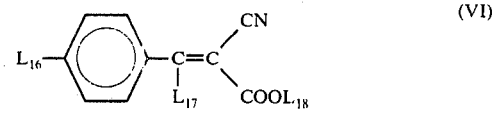

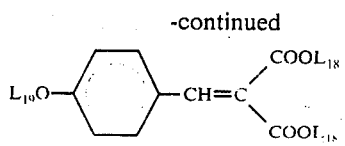

(VII)

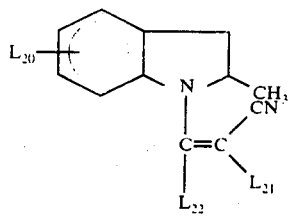

(VIII)

wherein $L_1$ denotes hydrogen, alkyl, alkenyl or aralkyl, $L_2$ denotes hydrogen, alkyl or chlorine, $L_3$ denotes hydrogen, hydroxyl, carboxyl, alkoxy or alkyl, $L_4$ denotes hydrogen, hydroxyl, alkoxy, alkenyloxy, aralkoxy or alkyl, $L_5$ denotes hydrogen, alkyl, alkenyl, cycloalkyl, aralkyl, aryl, acylamino, acylaminoalkyl or halogen, $L_6$ denotes hydrogen, alkyl, hydroxyl, alkoxy or acylamino, $L_7$ denotes hydrogen, alkyl, alkenyl, cycloalkyl, aralkyl, aryl, alkoxy, halogen, carboxyl, alkoxycarbonyl, alkoxycarbonylalkyl or acylamino, $L_8$ denotes hydrogen, alkyl, hydroxyl, alkoxy, halogen, acylamino, carboxyl, alkoxycarbonyl, acyloxy, carbamoyl, alkoxysulphonyl, aryloxysulphonyl or sulphonamido, $L_9$ denotes hydrogen, alkyl or halogen, $L_{10}$ and $L_{12}$ independently of one another denote hydrogen, alkyl, alkoxy, alkenyloxy, aralkoxy, aryloxy, halogen or alkoxycarbonyl, $L_{11}$ and $L_{13}$ independently of one another denote hydrogen or alkyl, $L_{14}$ and $L_{15}$ independently of one another denote hydrogen, alkyl, cycloalkyl or aralkyl, $L_{16}$ denotes hydrogen, alkoxy or aralkoxy, $L_{17}$ denotes alkyl or aryl, $L_{18}$ denotes alkyl, cycloalkyl or aralkyl, $L_{19}$ denotes alkyl or aralkyl, $L_{20}$ denotes hydrogen, alkyl, alkoxy or halogen, $L_{21}$ denotes nitrile or alkoxycarbonyl and $L_{22}$ denotes hydrogen or alkyl.

These new stabiliser systems improve the weathering resistance of styrene polymers in an unexpectedly lasting manner.

Examples of sterically hindered cyclic amines of the formula I which are suitable for the stabiliser systems according to the invention, correspond to the following formulae:

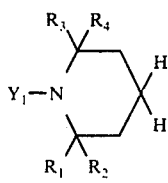

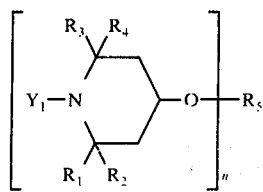

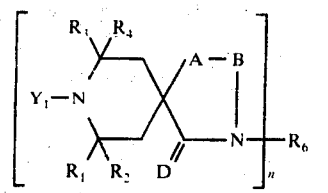

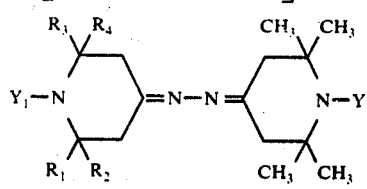

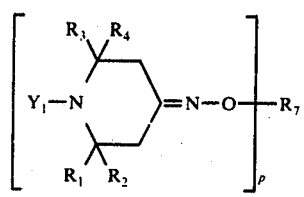

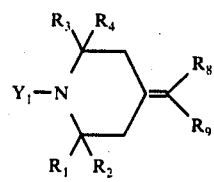

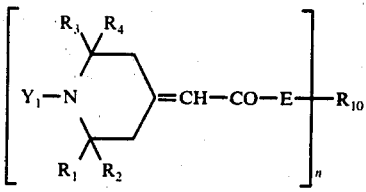

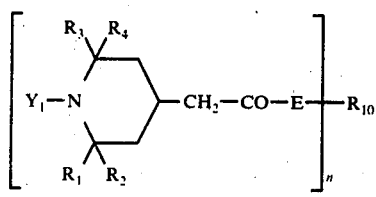

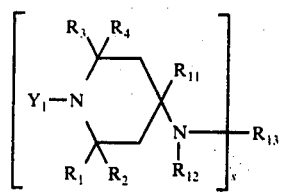

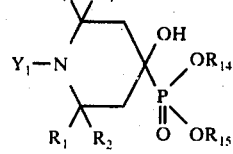

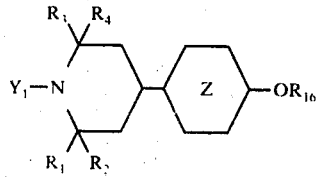

-continued

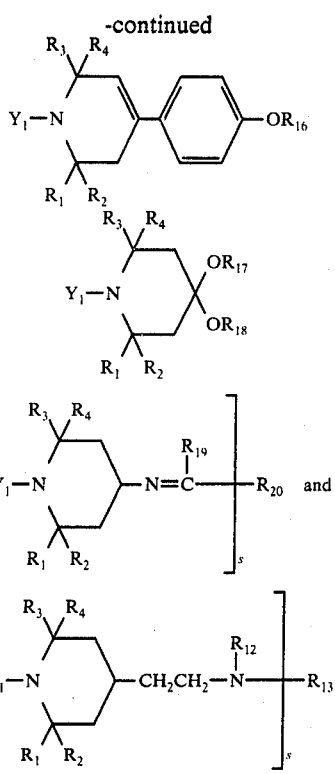

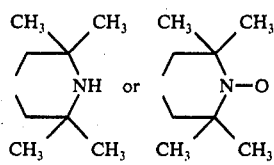

in which formulae $Y_1$ represents hydrogen, —O·, hydroxyl, alkyl, substituted alkyl, alkenyl, alkinyl, aralkyl, substituted aralkyl or acyl, $R_1$ and $R_2$ represent methyl or together represent —$(CH_2)_5$—, $R_3$ represents methyl, $R_4$ represents alkyl with 1-5 carbon atoms or together with $R_3$ represents the radicals —$(CH_2)_4$—, —$(CH_2)_5$—,

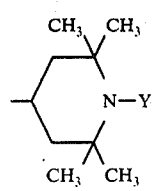

$s$ represents 1 or 2, $p$ represents 1 to 3, $n$ represents 1 to 4, $R_5$ represents hydrogen, a saturated or unsaturated, unsubstituted or substituted aliphatic, cycloaliphatic or araliphatic radical, an unsubstituted or substituted aromatic radical, a monovalent to tetravalent acyl radical which is derived from an aliphatic, cycoaliphatic, araliphatic, aromatic or heterocyclic monobasic or polybasic carboxylic acid, from a carbonic acid or from a monobasic or polybasic phosphoric, sulphuric, boric or silicic acid, an s-triazinyl radical or a group of the formula

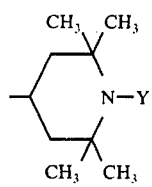

$R_6$ represents hydrogen, a saturated or unsaturated, unsubstituted or substituted aliphatic, cycloaliphatic or araliphatic radical, a substituted or unsubstituted aromatic radical, or a monacyl radical derived from a monobasic carboxylic acid or carbonic acid, A represents oxygen or =N—$R_{24}$, wherein $R_{24}$ is hydrogen, alkyl, substituted alkyl, alkenyl, alkinyl or aralkyl, B represents >C=O, >C=S, alkylidene, substituted alkylidene or aralkylidene, D represents oxygen, sulphur or NH, $R_7$ represents hydrogen, alkyl, aralkyl or a monoacyl, diacyl or triacyl radical derived from a monobasic to tribasic carboxylic acid, or a carbonic acid radical, $R_8$ and $R_9$ independently of one another represent alkoxycarbonyl, acyl, nitrile or phenyl, $R_{10}$ represents a saturated or unsaturated, unsubstituted or substituted, aliphatic, cycloaliphatic or araliphatic radical, an unsubstituted or substituted aromatic radical or a group of the formula:

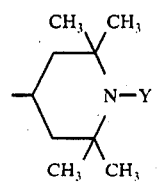

E represents oxygen, sulphur or >N—$R_{25}$, wherein $R_{25}$ is hydrogen, alkyl, cycloalkyl or aralkyl, $R_{11}$ represents hydrogen or alkyl, $R_{12}$ represents hydrogen, alkyl, cycloalkyl or aralkyl, $R_{13}$ represents hydrogen, a saturated or unsaturated, unsubstituted or substituted aliphatic, cycloaliphatic or araliphatic radical, an unsubstituted or substituted aromatic radical, a monovalent or divalent acyl radical derived from an aliphatic, cycloaliphatic, araliphatic, aromatic or heterocyclic monobasic or dibasic carboxylic acid, from a carbonic acid or from a monobasic or polybasic phosphoric acid or sulphuric acid, an s-triazinyl radical, a radical of the formula

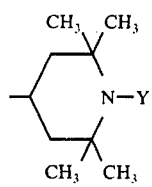

or, together with $R_{12}$, an alkylene radical which can be interrupted by hetero-atoms, $R_{14}$ and $R_{15}$ independently of one another represent alkyl, cycloalkyl or aralkyl or together represent alkylene, $R_{16}$ represents hydrogen or acyl, with the ring Z representing a benzene or cyclohexane ring which is unsubstituted or substituted by 1-3 alkyl, cycloalkyl or aralkyl groups, $R_{17}$ and $R_{18}$ represent the same alkyl group or together represent unsubstituted or substituted 1,2-ethylene, 1,3-propylene, 1,2-phenylene or a group of the formula

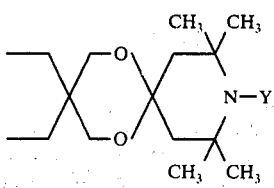

$R_{19}$ represents hydrogen, alkyl, alkenyl, aralkyl, aryl or substituted aryl and $R_{20}$ represents unsubstituted or substituted alkyl, alkenyl, aralkyl, unsubstituted or substituted aryl, or a heterocyclic radical, or $R_{19}$ and $R_{20}$ together represent cycloalkylidene, or correspond to one of the following formulae:

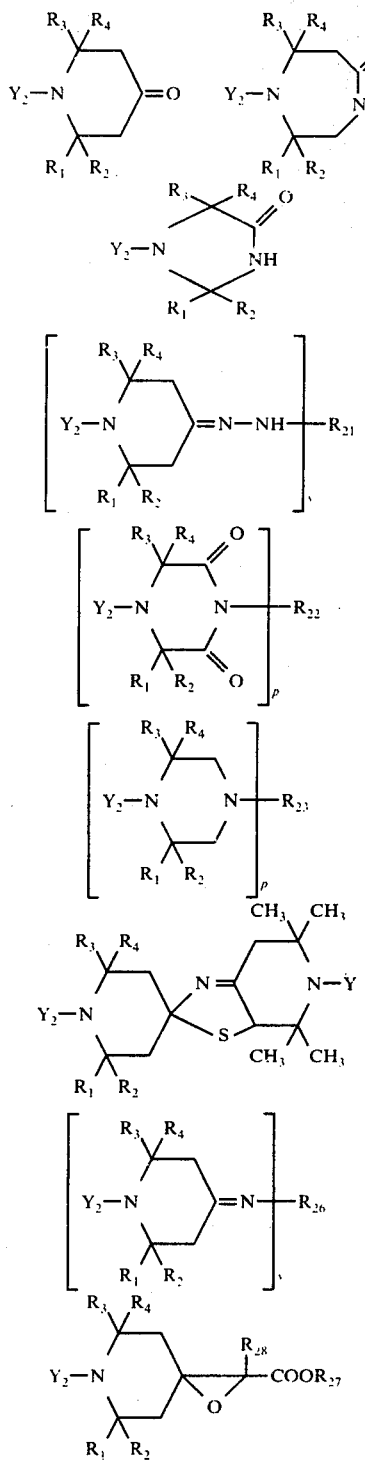

in which formulae $Y_2$ denotes hydrogen, —O or methyl, $s$, $p$, $R_1$, $R_2$, $R_3$ and $R_4$ denote what has been mentioned above, $R_{21}$ denotes a monovalent or divalent acyl radical derived from a monobasic or dibasic carboxylic acid or carbonic acid, $R_{22}$ denotes hydrogen, alkyl, alkoxycarbonylalkyl, aralkyl, alkylene, aralkylene or arenetriyl-tris-alkyl, $R_{23}$ denotes the same as $R_{22}$ or denotes a monoacyl or diacyl radical, $R_{26}$ denotes alkyl, cycloal-kyl, aralkyl, aryl, arylamino, alkylene, cycloalkylene or arylene, $R_{27}$ denotes alkyl and $R_{28}$ denotes hydrogen or alkyl with 1–5 carbon atoms, or correspond to the formula

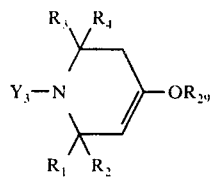

wherein $R_1$, $R_2$, $R_3$ and $R_4$ have the abovementioned meaning, $Y_3$ represents hydrogen or methyl and $R_{29}$ represents alkyl, cycloalkyl or aralkyl.

Preferably, in the formulae given for sterically hindered cyclic amines, and in the formulae II–VIII, $Y_1$ denotes hydrogen, —O·, alkyl with 1–8 carbon atoms, halogenoalkyl with 1–5 carbon atoms, cyanoalkyl with 1–5 carbon atoms, epoxyalkyl with 3–4 carbon atoms, hydroxyaralkyl with 8–12 carbon atoms, acyloxyalkyl with 4–20 carbon atoms, aminoalkyl with 2–4 carbon atoms, acylamino with 2–18 carbon atoms, alkoxycarbonylalkyl with 3–21 carbon atoms, alkoxyalkyl with 3–20 carbon atoms, aralkyl with 7–20 carbon atoms, alkenyl with 3–6 carbon atoms or alkinyl with 3–6 carbon atoms, $R_1$ and $R_2$ denote methyl, $R_3$ and $R_4$ denote methyl or together denote —(CH$_2$)$_5$ or the radical

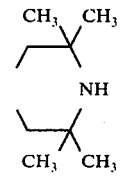

$s$ denotes 1, $p$ denotes 1, $n$ denotes 1 or 2, $R_5$ denotes hydrogen, alkyl with 1–12 carbon atoms, alkenyl with 3–4 carbon atoms, cycloalkyl with 6–8 carbon atoms, aralkyl with 7–9 carbon atoms, aryl with 6–10 carbon atoms, an acyl group which is derived from an aliphatic carboxylic acid with 1–20 carbon atoms, from an unsaturated carboxylic acid with 3–12 carbon atoms, from a cycloaliphatic carboxylic acid with 7–12 carbon atoms, from an araliphatic carboxylic acid with 8–12 carbon atoms, from a hydroxyphenylalkylcarboxylic acid with 9–16 carbon atoms, from an aliphatic carboxylic acid with 3–21 carbon atoms of which the carbon chain is interrupted by sulphur or oxygen, from an aromatic carboxylic acid with 7–12 carbon atoms, from a hydroxyphenylcarboxylic acid with 7–15 carbon atoms, from carbonic acid, from an aliphatic dicarboxylic acid with 2–20 carbon atoms, from an aliphatic dicarboxylic acid 4–8 carbon atoms of which the chain is interrupted by oxygen or sulphur, from an aromatic dicarboxylic acid with 8–12 carbon atoms or from a carbamic or thiocarbamic acid which is substituted at the nitrogen by alkyl with 1–18 carbon atoms, cycloalkyl with 6–8 carbon atoms, aralkyl with 7–9 carbon atoms or aryl with 6–10 carbon atoms, $R_6$ denotes hydrogen, alkyl with 1–20 carbon atoms, alkenyl with 3–6 carbon atoms, alkinyl with 3–6 carbon atoms, cycloalkyl with 6–8 carbon atoms, alkylcycloalkyl with 7–10 carbon atoms, aralkyl with 7–12 carbon atoms, aryl with 6–10 carbon atoms, alkylphenyl with 7–10 carbon atoms, epoxyalkyl with 3–5 carbon atoms, halogenoalkyl with 1–5 carbon atoms, hydroxyalkyl with 2-5 carbon atoms, alkoxyalkyl with 3-20 carbon atoms, alkoxycarbonylalkyl with 3-21 carbon atoms, acyloxyalkyl with 4-21 carbon atoms, alkylene with 4-8 carbon atoms, 3-oxapentamethylene, 3-thiapentamethylene, phenylene, alkylphenylene or p-xylylene, A denotes >NH or >N—$R_{24}$, wherein $R_{24}$ denotes hydrogen, alkyl with 1-6 carbon atoms, glycidyl, alkenyl with 3-4 carbon atoms, alkinyl with 3-4 carbon atoms or aralkyl with 7-9 carbon atoms, B denotes >C=O, >C=S or alkylidene with 5-18 carbon atoms, D denotes oxygen or >NH, $R_7$ denotes hydrogen, alkyl with 1-8 carbon atoms, aralkyl with 7-9 carbon atoms, an acyl group which is derived from an aliphatic carboxylic acid with 2-12 carbon atoms, from benzoic acid or from a carbamic acid which is substituted at the nitrogen by alkyl with 1-18 carbon atoms, benzyl or phenyl, $R_8$ and $R_9$ independently of one another denote alkoxycarbonyl with 2-6 carbon atoms, benzoyl, nitrile or phenyl, $R_{10}$ denotes alkyl with 1-18 carbon atoms, cycloalkyl with 6-8 carbon atoms, aralkyl with 7-12 carbon atoms, aryl with 6-10 carbon atoms, alkylene with 2-18 carbon atoms, aralkylene with 8-12 carbon atoms, arylene with 6-12 carbon atoms or a radical of the formulae

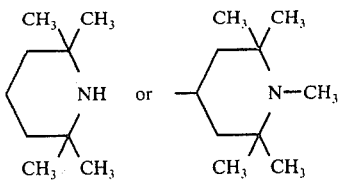

E denotes oxygen, sulphur or >N—$R_{25}$, wherein $R_{25}$ is hydrogen, alkyl with 1-12 carbon atoms, cyclohexyl or benzyl, $R_{11}$ denotes hydrogen or alkyl with 1-12 carbon atoms, $R_{12}$ denotes hydrogen, alkyl with 1-8 carbon atoms, cyclohexyl or benzyl, $R_{13}$ denotes hydrogen, alkyl with 1-8 carbon atoms, alkenyl with 3-4 carbon atoms, cycloalkyl with 6-8 carbon atoms, aralkyl with 7-9 carbon atoms, phenyl, alkylphenyl with 7-12 carbon atoms, or an acyl group which is derived from an aliphatic monocarboxylic acid with 1-20 carbon atoms, from an unsaturated carboxylic acid with 3-12 carbon atoms, from an aliphatic carboxylic acid with 3-21 carbon atoms which is substituted by alkoxy or alkylthio groups, from an aromatic carboxylic acid with 7-10 carbon atoms or from a carbamic or thiocarbamic acid which is substituted at the nitrogen by alkyl with 1-18 carbon atoms, cycloalkyl with 6-8 carbon atoms, aralkyl with 7-9 carbon atoms or aryl with 6-12 carbon atoms, $R_{14}$ and $R_{15}$ denote alkyl with 1-12 carbon atoms, cyclohexyl, benzyl, halogenoalkyl with 2-5 carbon atoms or, together, ethylene or 1,2-propylene, $R_{16}$ denotes hydrogen or the radical of an acyl group which is derived from an aliphatic carboxylic acid with 2-18 carbon atoms, from an aromatic carboxylic acid with 7-10 carbon atoms or from a carbamic acid substituted at the nitrogen by alkyl with 1-12 carbon atoms, benzyl or phenyl, with the ring Z representing a benzene or cyclohexane ring which is not substituted further or is substituted further by 1-2 alkyl groups with 1-5 carbon atoms, $R_{17}$ and $R_{18}$ denote alkyl with 1-8 carbon atoms, alkylene with 2-5 carbon atoms, 1,2-phenylene or a group of the formula

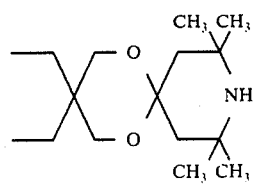

$R_{19}$ denotes hydrogen, alkyl with 1-4 carbon atoms, alkenyl with 3-4 carbon atoms, benzyl or phenyl, $R_{20}$ denotes alkyl with 1-12 carbon atoms, alkenyl with 3-4 carbon atoms, aralkyl with 7-9 carbon atoms, aryl with 6-10 carbon atoms, alkoxyaryl with 7-9 carbon atoms, furyl, thienyl or, together with $R_{19}$, —$(CH_2)_5$—, $R_{21}$ denotes an acyl group which is derived from an aliphatic carboxylic acid with 1-20 carbon atoms, from an aliphatic carboxylic acid with 3-20 carbon atoms of which the chain is interrupted by oxygen or sulphur atoms, from a cycloaliphatic carboxylic acid with 7-12 carbon atoms, from an araliphatic carboxylic acid with 8-12 carbon atoms, from an hydroxyaraliphatic monocarboxylic acid with 9-16 carbon atoms, from an aromatic carboxylic acid with 7-15 carbon atoms or from a hydroxybenzoic acid with 7-15 carbon atoms, $R_{22}$ denotes hydrogen, alkyl with 1-20 carbon atoms, benzyl, alkylene with 1-20 carbon atoms or alkoxycarbonylalkyl with 2-26 carbon atoms, $R_{23}$ denotes the same as $R_{22}$ or denotes an acyl group which is derived from an aliphatic carboxylic acid with 2-20 carbon atoms, from benzoic acid or from a carbamic acid substituted at the nitrogen by alkyl with 1-24 carbon atoms or phenyl, $R_{26}$ denotes alkyl with 1-16 carbon atoms, cycloalkyl with 6-8 carbon atoms, aralkyl with 7-12 carbon atoms, aryl with 6-10 carbon atoms or arylamino with 6-10 carbon atoms, $R_{27}$ denotes alkyl with 1-8 carbon atoms, $R_{28}$ denotes hydrogen or methyl, $R_{29}$ denotes alkyl with 1-18 carbon atoms, cycloalkyl with 5-6 carbon atoms or aralkyl with 7-12 carbon atoms, $L_1$ denotes hydrogen, alkyl with 1-18 carbon atoms, allyl, methallyl or benzyl, $L_2$ denotes hydrogen, $L_3$ denotes hydrogen or hydroxyl, $L_4$ denotes hydrogen, hydroxyl, alkoxy with 1-20 carbon atoms, allyloxy, methallyloxy or benzyloxy, $L_5$ denotes hydrogen, alkyl with 1-12 carbon atoms, alkenyl with 3-12 carbon atoms, cyclohexyl, aralkyl with 7-11 carbon atoms, phenyl, acylamino with 2-12 carbon atoms, acylaminomethyl with 3-13 carbon atoms, chlorine or bromine, $L_6$ denotes hydrogen, methyl, hydroxyl, alkoxy with 1-12 carbon atoms or acylamino with 2-12 carbon atoms, $L_7$ denotes hydrogen, alkyl with 1-12 carbon atoms, aralkyl with 7-11 carbon atoms, cyclohexyl, phenyl, alkoxycarbonylethyl with 4-15 carbon atoms, alkoxy with 1-12 carbon atoms, chlorine, bromine, carboxyl, alkoxycarbonyl with 2-13 carbon atoms or acylamino with 2-12 carbon atoms, $L_8$ denotes hydrogen, alkyl with 1-8 carbon atoms, alkoxy with 1-12 carbon atoms, chlorine, bromine, acylamino with 2-12 carbon atoms, carboxyl, alkoxycarbonyl with 2-13 carbon atoms, acyloxy with 2-12 carbon atoms, carbamoyl with 3-17 carbon atoms, alkoxysulphonyl with 1-12 carbon atoms, phenoxysulphonyl or sulphonamido with 2-16 carbon atoms, $L_9$ denotes hydrogen, methyl, chlorine or bromine, $L_{10}$ and $L_{12}$ independently of one another denote alkyl with 1-8 carbon atoms, alkoxy with 1-12 carbon atoms, allyloxy, methallyloxy, phenoxy, benzyloxy, chlorine, bromine or alkoxycarbonyl with 2-13 carbon atoms, $L_{11}$ and $L_{13}$ independently of one another denote hydrogen or alkyl with 1–8 carbon atoms, $L_{14}$ and $L_{15}$ independently of one another denote hydrogen or alkyl with 1–12 carbon atoms, $L_{16}$ denotes alkoxy with 1–12 carbon atoms, $L_{17}$ denotes alkyl with 1–3 carbon atoms or phenyl, $L_{18}$ denotes alkyl with 1–12 carbon atoms, $L_{19}$ denotes alkyl with 1–12 carbon atoms, $L_{20}$ denotes hydrogen, alkyl with 1–8 carbon atoms, alkoxy with 1–8 carbon atoms or chlorine, $L_{21}$ denotes nitrile or alkoxycarbonyl with 2–20 carbon atoms and $L_{22}$ denotes hydrogen or alkyl with 1–3 carbon atoms.

$Y_1$ is above all hydrogen, —O·, alkyl with 1–8 C atoms or alkenyl with 2–7 C atoms, especially hydrogen, O·, methyl or allyl.

Particularly preferentially, in the formulae given for sterically hindered cyclic amines and in the formulae II–VIII, $Y_1$ denotes hydrogen, —O· or methyl, $R_1$, $R_2$, $R_3$ and $R_4$ denote methyl, $s$ denotes 1, $p$ denotes 1, $n$ denotes 1 or 2, $R_5$ denotes hydrogen, or an acyl group which is derived from an aliphatic carboxylic acid with 1–18 carbon atoms, from acrylic acid or methacrylic acid, from benzoic acid or from an alkylbenzoic acid with 8–11 carbon atoms, from salicylic acid, from an aliphatic dicarboxylic acid with 4–14 carbon atoms, from terephthalic acid, from isophthalic acid or from a carbamic or thiocarbamic acid which is substituted at the nitrogen by alkyl with 1–12 carbon atoms, benzyl or phenyl, $R_6$ denotes alkyl with 1–12 carbon atoms, allyl, benzyl, cyclohexyl, glycidyl, hydroxyethyl, alkoxyalkyl with 3–10 carbon atoms, alkoxycarbonylalkyl with 3–14 carbon atoms, hexamethylene or 3-oxapentamethylene, A denotes >NH or >N—$R_{24}$, wherein $R_{24}$ is hydrogen, methyl, ethyl or benzyl, B denotes >C=O, D denotes oxygen, $R_7$ denotes hydrogen, methyl, benzyl, benzoyl or phenylcarbamoyl, $R_8$ denotes nitrile, $R_9$ denotes ethoxycarbonyl, phenyl or benzoyl, $R_{10}$ denotes alkyl with 6–8 carbon atoms, cyclohexyl, benzyl, alkylene with 4–12 carbon atoms, xylylene, phenylene or a radical of the formula

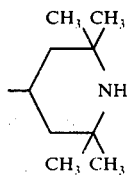

E denotes oxygen or >NH, $R_{11}$ denotes hydrogen, $R_{12}$ denotes hydrogen or methyl, $R_{13}$ hydrogen or an acyl group which is derived from an aliphatic carboxylic acid with 1–8 carbon atoms, from acrylic or methacrylic acid, from a benzoic acid with 7–10 carbon atoms, from salicylic acid or from a carbamic or thiocarbamic acid which is substituted at the nitrogen by alkyl with 1–12 carbon atoms, benzyl or phenyl, $R_{14}$ and $R_{15}$ denote alkyl with 4–8 carbon atoms, benzyl or chloroethyl, $R_{16}$ denotes hydrogen or the radical of an acyl group which is derived from an aliphatic carboxylic acid with 2–12 carbon atoms, from benzoic acid or from a N-alkyl-carbamic acid with 2–8 carbon atoms, with the ring Z representing a benzene ring which is substituted further by 1–2 methyl, isopropyl or tert.-butyl groups, $R_{17}$ and $R_{18}$ denote methyl, ethylene, 1,3-propylene or a group of the formula

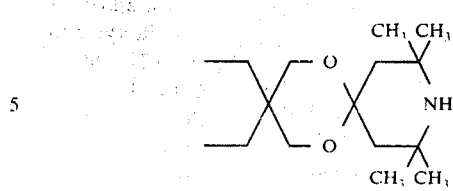

$R_{19}$ denotes hydrogen, $R_{20}$ denotes alkyl with 1–8 carbon atoms, benzyl, phenyl, alkoxyphenyl with 7–10 carbon atoms, or together with $R_{19}$, —(CH$_2$)$_5$—, $R_{21}$ denotes an acyl group which is derived from an aliphatic monocarboxylic acid with 3–18 carbon atoms of which the chain can be interrupted by sulphur atoms, from phenylacetic acid, from benzoic acid or from salicyclic acid, $R_{22}$ denotes hydrogen, alkyl with 6–18 carbon atoms or benzyl, $R_{23}$ denotes the same as $R_{22}$ or an acyl group which is derived from an aliphatic carboxylic acid with 3–18 carbon atoms, from benzoic acid or from a carbamic acid which is substituted at the nitrogen by alkyl with 1–12 carbon atoms or phenyl, $R_{24}$ denotes hydrogen, methyl, ethyl or benzyl, $R_{26}$ denotes alkyl with 4–18 carbon atoms, benzyl or phenyl, $R_{27}$ denotes alkyl with 1–4 carbon atoms, $R_{28}$ denotes hydrogen, $R_{29}$ denotes alkyl with 4–18 carbon atoms or benzyl, $L_1$ denotes hydrogen, alkyl with 1–12 carbon atoms or benzyl, $L_2$ denotes hydrogen, $L_3$ denotes hydrogen or hydroxyl, $L_4$ denotes hydrogen, hydroxyl or alkoxy with 1–12 carbon atoms, $L_5$ denotes hydrogen, alkyl with 1–8 carbon atoms, allyl, methallyl, phenyl, benzyl, α-phenethyl, α-phenylisopropyl, acylaminomethyl with 3–9 carbon atoms or chlorine, $L_6$ denotes hydrogen, methyl, hydroxyl or alkoxy with 1–8 carbon atoms, $L_7$ denotes hydrogen, alkyl with 1–8 carbon atoms, cyclohexyl, phenyl, benzyl, α-phenethyl, α-phenylisopropyl or chlorine, $L_8$ denotes hydrogen, methyl or chlorine, $L_9$ denotes hydrogen, $L_{10}$ and $L_{12}$ independently of one another denote alkyl with 1–4 carbon atoms, alkoxy with 1–8 carbon atoms or chlorine, $L_{11}$ and $L_{13}$ independently of one another denote hydrogen or alkyl with 1–4 carbon atoms, $L_{14}$ denotes hydrogen or alkyl with 1–8 carbon atoms, $L_{15}$ denotes hydrogen, $L_{16}$ denotes alkoxy with 1–4 carbon atoms, $L_{17}$ denotes methyl or phenyl, $L_{18}$ denotes alkyl with 1–8 carbon atoms, $L_{19}$ denotes alkyl with 1–4 carbon atoms, $L_{20}$ denotes hydrogen, $L_{21}$ denotes alkoxycarbonyl with 2–5 carbon atoms and $L_{22}$ denotes hydrogen.

If, Y, $Y_1$, $R_4$, $R_5$, $R_6$, $R_7$, $R_{10}$, $R_{11}$, $R_{12}$, $R_{13}$, $R_{14}$, $R_{17}$, $R_{18}$, $R_{19}$, $R_{20}$, $R_{22}$, $R_{23}$, $R_{24}$, $R_{25}$, $R_{26}$, $R_{27}$, $R_{28}$, $R_{29}$, $L_1$, $L_2$, $L_3$, $L_4$, $L_5$, $L_6$, $L_7$, $L_8$, $L_9$, $L_{10}$, $L_{11}$, $L_{12}$, $L_{13}$, $L_{14}$, $L_{15}$, $L_{17}$, $L_{18}$, $L_{19}$, $L_{20}$ and $L_{22}$ denote alkyl, then this is, for example, within the scope of the indicated limits, methyl, ethyl, propyl, butyl, pentyl, hexyl, octyl, decyl, dodecyl, tetradecyl, octadecyl, eicosyl, iso-propyl, iso-butyl, tert.-butyl, iso-pentyl, tert.-amyl, iso-octyl or tert.-octyl.

If Y, $Y_1$, $R_5$, $R_6$, $R_{13}$, $R_{19}$, $R_{20}$, $L_1$, $L_5$ and $L_7$ denote alkenyl and/or alkinyl, this is, for example, within the scope of the indicated limits, allyl, methallyl, 3-hexenyl, 4-octenyl, 10-undecenyl, propargyl, but-1-inyl, but-2-inyl or 1-hexinyl.

If Y, $Y_1$, $R_5$, $R_6$, $R_7$, $R_{10}$, $R_{12}$, $R_{13}$, $R_{14}$, $R_{15}$, $R_{19}$, $R_{20}$, $R_{22}$, $R_{23}$, $R_{24}$, $R_{25}$, $R_{26}$, $R_{29}$, $L_1$, $L_5$, $L_7$, $L_{14}$, $L_{15}$, $L_{18}$ and $L_{19}$ denote aralkyl or hydroxyaralkyl, this is, for example, within the scope of the indicated limits, benzyl, α-methylbenzyl, α,α-dimethylbenzyl, naphthyl-1-methyl or 2-hydroxy-2-phenylethyl.

If $R_5$, $R_6$, $R_{10}$, $R_{12}$, $R_{13}$, $R_{14}$, $R_{15}$, $R_{25}$, $R_{26}$, $R_{29}$, $L_5$, $L_7$, $L_{14}$, $L_{15}$ and $L_{18}$ denote cycloalkyl or alkylcycloalkyl, this is, for example, cyclohexyl, cyclooctyl, 4-methylcyclohexyl or 4-tert.-butylcyclohexyl.

If $Y_1$, $R_6$, $R_{14}$ and $R_{15}$ denote halogenoalkyl, this is, for example, 2-chloroethyl, 2-bromoethyl, 2-chloropropyl, 3-bromopropyl, 4-chlorobutyl or 2-chloro-2-phenylethyl.

If $Y_1$ denotes cyanoalkyl, this is, for example, 2-cyanoethyl, 2-cyanopropyl, 3-cyanopropyl or 4-cyanopentyl.

If $Y_1$ and $R_6$ denote epoxyalkyl, this is, for example, glycidyl, 2,3-epoxy-3-methylpropyl, 3,4-epoxy-n-butyl or 4,5-epoxy-n-pentyl.

If $Y_1$ and $R_6$ denote hydroxyalkyl, this is, for example, 2-hydroxyethyl, 2-hydroxypropyl, 3-hydroxypropyl, 2-hydroxybutyl or 4-hydroxypentyl.

If $Y_1$ and $R_6$ denote alkoxyalkyl, this is, for example, 2-methoxy-ethyl, 2-ethoxyethyl, 2-propoxyethyl, 3-methoxypropyl, 2-butoxyethyl, 4-methoxypentyl, 2-octoxyethyl, 2-dodecyloxyethyl or 2-octadecyloxyethyl.

If $Y_1$ and $R_6$ denote acyloxyalkyl, this is, for example, 2-acetoxyethyl, 2-acetoxypropyl, 3-acetoxypropyl, 4-propionyloxybutyl, 2-(methylcarbamoyloxy)-ethyl, 2-(ethylcarbamoyloxy)ethyl, 2-(phenylcarbamoyloxy)ethyl, 2-(alkylthiocarbamoyloxy)ethyl, 4-propionyloxy-pentyl or 2-octadecanoyloxyethyl.

If $Y_1$ denotes aminoalkyl, this is, for example, 2-aminoethyl, 2-dimethylaminoethyl, 3-dimethylaminopropyl or 2-octylaminoethyl.

If $L_5$ denotes acylaminoalkyl, this is, for example, acetyl-, propionyl-, butyroyl-, 2-ethylhexanoyl- or lauroylaminomethyl or the radical of the formula

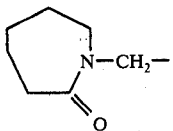

If Y, $R_6$, $R_{22}$ and $L_7$ denote alkoxycarbonylalkyl, this is, for example, within the scope of the indicated limits, 2-methoxycarbonylethyl, 2-ethoxycarbonylethyl, 2-butoxycarbonylethyl, hexyloxycarbonylmethyl, methoxycarbonylpropyl, 2-dodecyloxycarbonylethyl, 2-octadecyloxycarbonylethyl or 2-eicosyloxycarbonylethyl.

If $R_5$, $R_6$, $R_{10}$, $R_{20}$ and $R_{26}$ denote aryl, this is, for example, within the scope of the indicated limits, phenyl or naphthyl.

If $R_5$ and $R_{13}$ denote alkylphenyl, this is, for example, within the scope of the indicated limits, tolyl, 2,4-xylyl, 2,6-xylyl, 4-tert.-butylphenyl, 4-tert.-octylphenyl, methylnaphthyl or dimethylnaphthyl.

If Y, $R_6$, $R_{10}$, $R_{17}$, $R_{18}$, $R_{22}$ and $R_{26}$ denote alkylene, this is for example, within the scope of the indicated limits, methylene, ethylene, propylene, butylene, hexamethylene, octamethylene, dodecamethylene or octadecamethylene.

If $R_{10}$ and $R_{22}$ denote aralkylene, this is, for example, within the scope of the indicated limits, p-xylylene, 1,4-bis(ethylene)phenylene or dimethyl-p-xylylene.

If B denotes alkylidene, this is, for example, within the scope of the indicated limits, 1-pentylidene, 1-hexylidene, 1-octylidene, 1-dodecylidene or 1-octadecylidene.

If $R_{10}$ denotes alkanetriyl or alkanetetrayl, this is, for example, within the scope of the indicated limits, one of the radicals of the formulae

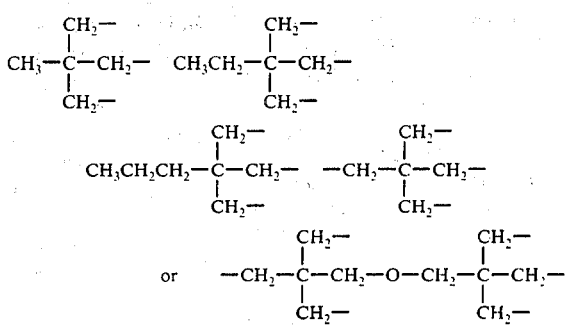

If $R_6$, $R_{10}$ and $R_{26}$ denote arylene, this is, for example, within the scope of the indicated limits, 1,2-phenylene, 1,3-phenylene, 1,4-phenylene, 1,4-naphthylene, 1,5-naphthylene, 2,6-naphthylene, dimethylphenylene or dimethylnaphthylene.

If $R_{22}$ denotes alkylene-bis-(oxycarbonylalkyl), this is, for example, within the scope of the indicated limits, ethylene-bis-(oxycarbonylmethyl), ethylene-bis-(oxycarbonylethyl), 1,2-propylene-bis-(oxycarbonylethyl), 1,4-tetramethylene-bis-(oxycarbonylpropyl) or 1,6-hexamethylene-bis-(oxycarbonylethyl).

If Y, $Y_1$, $R_5$, $R_7$, $R_{13}$, $R_{16}$, $R_{21}$ and $R_{23}$ denote an acyl group which is derived from an aliphatic, unsaturated, cycloaliphatic or araliphatic carboxylic acid or from an aliphatic or aromatic carboxylic acid interrupted by sulphur or oxygen, this is, for example, within the scope of the indicated limits, formyl, acetyl, propionyl, butyroyl, hexanoyl, heptanoyl, oxtanoyl, 2-ethylhexanoyl, 2,2,4-trimethylpentanoyl, decanoyl, dodecanoyl, tetradecanoyl, hexadecanoyl, octadecanoyl, eicosoyl, acryloyl, methacryloyl, crotonoyl, 10-undecenoyl, 9-octadecenoyl, phenylacetyl, β-phenylpropionyl, β-trimethylphenyl-propionyl, (4-hydroxy-3,5-di-tert.-butyl-phenyl)acetyl, β-(4-hydroxy-3,5-di-tert.-butylphenyl)propionyl, β-(3-tert.-butyl-4-hydroxy-5-methylphenyl)propionyl, cyclohexanecarbonyl,4-tert.-butylcyclohexanoyl, β-methylthiopropionyl, methylthioacetyl, β-octylthiopropionyl, β-dodecylthiopropionyl, β-octadecylthiopropionyl, butylthioacetyl, octylthioacetyl, cinnamoyl, benzoyl, o-, m- or p-toluoyl, m-chlorobenzoyl, p-tert.-butylbenzoyl, 3,5-di-tert.-butyl-4-hydroxybenzoyl or 2,4-dimethylbenzoyl.

If $R_5$, $R_7$, $R_{13}$, $R_{16}$, $R_{21}$, $R_{22}$ and $R_{23}$ denote an acyl group which is derived from an aliphatic dicarboxylic acid of which the chain can be interrupted by oxygen or sulphur, or is derived from an aromatic dicarboxylic acid, this is, for example, within the scope of the indicated limits, the divalent radical of oxalic, malonic, succinic, glutaric, adipic, pimelic, suberic, azelaic or sebacic acid, 1,12-dodecanedicarboxylic acid or 1,18-octadecanedicarboxylic acid, thiodiacetic acid, thiodipropionic acid, oxydipropionic acid, phthalic acid, isophthalic acid, terephthalic acid, dimethylterephthalic acid, tetrahydrophthalic acid or hexahydrophthalic acid.

If $R_5$, $R_7$, $R_{13}$, $R_{16}$ and $R_{23}$ denote the radical of a carbamic acid or thiocarbamic acid, this is, for example, within the scope of the indicated limits, carbamoyl, N-methyl-, N-ethyl-, N-propyl-, N-isopropyl-, N-butyl-, N-pentyl-, N-octyl-, N-decyl-, N-dodecyl-, N-octadecyl-, N-allyl-, N-methallyl-, N-undecenyl-, N-cyclohexyl-, N-methylcyclohexyl-, N-benzyl-, N-($\beta$-phenethyl)-, N-phenyl-, N-o-tolyl, N-p-tolyl-, N-2,4-xylyl-, N,N-dimethyl-, N-methyl-N-ethyl-, N,N-diethyl-, N,N-diisopropyl- or N,N-di-n-butyl-carbamoyl or the corresponding thiocarbamoyl radicals.

If $R_{23}$ denotes the radical of an alkylene- or arylene-bis-carbamic acid, this is, for example, within the scope of the indicated limits, ethylene-bis-carbamoyl, hexamethylene-bis-carbamoyl, 1,4-phenylene-bis-carbamoyl or tolylene-bis-carbamoyl.

If $R_8$, $R_9$, $L_7$, $L_8$, $L_{10}$, $L_{12}$ and $L_{21}$ denote alkoxycarbonyl, this is, for example, within the scope of the indicated limits, methoxy-, ethoxy-, propoxy-, butoxy-, iso-butoxy-, pentyloxy-, hexyloxy-, octoxy- or dodecyloxy-carbonyl.

If $L_4$, $L_6$, $L_7$, $L_8$, $L_{10}$, $L_{12}$, $L_{16}$ and $L_{20}$ denote alkoxy, this is, for example, within the scope of the indicated limits, methoxy, ethoxy, propoxy, butoxy, $\beta$-methoxyethoxy, pentyloxy, iso-butoxy, octoxy, dodecyloxy, tetradecyloxy, octadecyloxy or eicosyloxy.

If $L_8$ denotes acyloxy, this is, for example, within the scope of the indicated limits, acetoxy, propionyloxy, butyroyloxy, 2-ethylhexanoyloxy or lauroyloxy.

If $R_{26}$ denotes arylamino, this is, for example, within the scope of the indicated limits, phenylamino, p-tolylamino or p-tert.-butylphenylamino.

If Y, $L_5$, $L_7$ and $L_8$ denote acylamino, this is, for example, within the scope of the indicated limits, acetyl-, propionyl-, butyroyl-, pentanoyl-, 2-ethylhexanoyl-, lauroyl-, stearoyl-, phenylacetyl-, acryloyl-, methacryloyl- or cyclohexylcarbonyl-amino.

If $L_8$ denotes carbamoyl, alkoxysulphonyl, aryloxysulphonyl or sulphonamido, this is, for example, within the scope of the indicated limits, N,N-dimethyl-, N,N-diethyl-, N-butyl-, N-octyl- or N,N-dioctyl-carbamoyl or -sulphonamido, methoxysulphonyl, ethoxysulphonyl, butoxysulphonyl, octoxysulphonyl, dodecyloxysulphonyl or phenoxysulphonyl.

Examples of compounds of the formula I are:
I. 1. 4-Benzoyloxy-,
I. 2. 4-Salicyloyloxy-,
I. 3. 4-Capryloyloxy-,
I. 4. 4-Stearoyloxy-,
I. 5. 4-($\beta$-3,5-di-tert.-butyl-4-hydroxyphenyl-propionyloxy) and
I. 6. 4-(3,5-di-tert.-butyl-4-hydroxybenzoyloxy)-2,2,6,6-tetramethylpiperidine,
I. 7. 4-Benzoyloxy-,
I. 8. 4-Salicyloyloxy-,
I. 9. 4-Stearoyloxy- and
I. 10. 4-tert.-butylbenzoyloxy-1,2,2,6,6-pentamethylpiperidine.
I. 11. Bis-(2,2,6,6-tetramethyl-4-piperidyl)-sebacate.
I. 12. Bis-(2,2,6,6-tetramethyl-4-piperidyl)-suberate.
I. 13. Bis-(2,2,6,6-tetramethyl-4-piperidyl)-dodecanedioate.
I. 14. Bis-(1,2,2,6,6-pentamethyl-4-piperidyl)-sebacate.
I. 15. 4-Capryloyloxy-1-propyl-2,2,6,6-tetramethyl-piperidine.
I. 16. 4-Capryloxyloxy-1-allyl-2,2,6,6-tetramethyl-piperidine.
I. 17. 4-Benzoylamido-,
I. 18. 4-Acryloylamido- and
I. 19. 4-Stearoylamido-2,2,6,6-tetramethylpiperidine.
I. 20. N,N'-Bis(2,2,6,6-tetramethyl-4-piperidyl)oxalamide.
I. 21. N-(2,2,6,6-Tetramethyl-4-piperidyl)cyclohexanoneimine.
I. 22. (2,2,6,6-Tetramethylpiperidin-4-one)-azine.
I. 23. 3-n-Butyl-,
I. 24. 3-n-Butyl-8-methyl-,
I. 25. 3-n-Octyl-,
I. 26. 3-n-Octyl-8-methyl-,
I. 27. 3-Allyl-,
I. 28. 3-Allyl-8-methyl-,
I. 29. 3-Glycidyl-,
I. 30. 3-Glycidyl-8-methyl-,
I. 31. 3-Octadecyl-,
I. 32. 3-Cyclohexyl-,
I. 33. 1,3,8-Trimethyl-,
I. 34. 1,8-Dimethyl-3-hexamethylene-bis-,
I. 35. 1,8-Dimethyl-3-(3-oxapentamethylene-bis)-,
I. 36. 8-Methyl- and
I. 37. 3-n-Octyl-8-benzyl-7,7,9,9-tetramethyl-1,3,8-triazaspiro[4.5]decane-2,4-dione.
I. 38. 1,3,8-Triaza-2-n-undecyl-4-oxo-7,7,9,9-tetramethylspiro[4.5]decane.
I. 39. 2,4,6-Tris-(2,2,6,6-tetramethyl-4-piperidyloxy)-s-triazine.
I. 40. 2,4,6-Tris-(1,2,2,6,6-pentamethyl-4-piperidyloxy)-s-triazine.
I. 41. 2,4,6-Tris-(2,2,6,6-tetramethyl-4-piperidylamino)-s-triazine.
I. 42. 2,2,6,6-Tetramethyl-4-$\beta$-cyanoethoxy-piperidine.
I. 43. 1,2,2,6,6-Pentamethyl-4-lauroyloxy-piperidine.
I. 44. Triacetone-amine-oxime.
I. 45. Ethyl (2,2,6,6-tetramethylpiperidinylidene-4)-acetate.
I. 46. (2,2,6,6-Tetramethylpiperidinyl-4-)acetic acid octadecyl ester.
I. 47. Ethyl (1,2,2,6,6-pentamethylpiperidinyl-4)-acetate.
I. 48. 2,2,6,6-Tetramethyl-4-hydroxy-(2,2,6,6-tetramethylpiperidinyl-4-acetate).
I. 49. N,N'-Bis-(2,2,6,6-tetramethylpiperidinyl-4-acetyl)-ethylenediamine.
I. 50. 2,2,6,6-Tetramethyl-4-($\beta$-capryloylaminoethyl)-piperidine.
I. 51. N,N'-Bis-[$\beta$-(2,2,6,6-tetramethylpiperidinyl-4)-ethyl]oxalamide.
I. 52. 2,6-Dimethyl-4-(2,2,6,6-tetramethylpiperidinyl-4)-phenol.
I. 53. Bis-(2,2,6,6-tetramethylpiperidinyl-4)-adipoyldihydrazone.
I. 54. 2,2,6,6-Tetramethylpiperidinyl-4-caproylhydrazone.
I. 55. 2,2,7,7-Tetramethyl-hexahydro-5H-1,4-diazepin-5-one.
I. 56. 5,5,7,7-Tetramethylpiperidino-[5.4-C]-$\Delta^3$-thiazoline-2-spiro-4'-(2',2',6',6'-tetramethylpiperidine).
I. 57. Cyclohexane-1-spiro-2'-(4'-oxoimidazolidine)-5'-spiro-1''-cyclohexane.
I. 58. 7,15-Diazadispiro[5,1,5,3]hexadecane.
I. 59. 4-n-Octadecyl-2,2,6,6-tetramethyl-3,5-diketopiperazine.
I. 60. 15,15'-Sebacoyl-bis(7,15-diazadispiro[5,1,5,3]hexadecane).
I. 61. 1-n-Octyl-,
I. 62. 1-n-Dodecyl-,
I. 63. 1-$\beta$-Stearoyloxyethyl- and
I. 64. 1-n-Octoxycarbonylmethyl-2,2,6,6-tetramethylpiperidine.

I. 65. 2,2,6,6-Tetramethyl-4-benzoylpiperidin-1-oxyl.
I. 66. Bis-(2,2,6,6-tetramethyl-4-piperidinyl-1-oxyl)-sebacate.

Examples of compounds of the formula II are:
II. 1. 2,4-Dihydroxy-,
II. 2. 2-Hydroxy-4-methoxy-,
II. 3. 2-Hydroxy-4-octoxy-
II. 4. 2-Hydroxy-4-dodecyloxy-,
II. 5. 2-Hydroxy-4-benzyloxy-,
II. 6. 2-Hydroxy-4,4'-dimethoxy-,
II. 7. 2,4,4'-trihydroxy-,
II. 8. 2,2'-Dihydroxy-4,4'-dimethoxy-,
II. 9. 2,2',4,4'-Tetrahydroxy-,
II. 10. 2,2'-Dihydroxy-4-methoxy-,
II. 11. 2-Hydroxy-2'-carboxy-4-methoxy-,
II. 12. 2,2'-Dihydroxy-4-octoxy- and
II. 13. 2,2'-Dihydroxy-4-dodecyloxy-benzophenone.

Examples of compounds of the formula III are:
III. 1. 2-(2'-Hydroxy-5'-methylphenyl)-,
III. 2. 2-(2'-Hydroxy-5'-tert.-butylphenyl)-,
III. 3. 2-(2'-Hydroxy-5'-tert.-octylphenyl)-,
III. 4. 2-(2'-Hydroxy-3'-tert.-butyl-5'-methylphenyl)-,
III. 5. 2-(2'-Hydroxy-3'-tert.-butyl-5'-methylphenyl)-5-chloro-,
III. 6. 2-(2'-Hydroxy-3',5'-di-tert.-butylphenyl)-,
III. 7. 2-(2'-Hydroxy-3',5'-di-tert.-butylphenyl)-5-chloro-,
III. 8. 2-(2'-Hydroxy-3',5'-di-tert.-amylphenyl)-,
III. 9. 2-(2'-Hydroxy-3',5'-di-tert.-amylphenyl)-5-chloro-,
III. 10. 2-(2'-Hydroxy-3'-sec.-butyl-5'-tert.-butylphenyl)-,
III. 11. 2-(2'-Hydroxy-3'-tert.-butyl-5'-sec.-butylphenyl)-,
III. 12. 2-(2',4'-Dihydroxyphenyl)-,
III. 13. 2-(2'-Hydroxy-4'-methoxyphenyl)-,
III. 14. 2-(2'-Hydroxy-4'-octoxyphenyl)-,
III. 15. 2-(2'-Hydroxy-3'-α-phenylethyl-5'-methylphenyl)- and
III. 16. 2-(2'-Hydroxy-3'-α-phenylethyl-5'-methylphenyl)-5-chloro-benztriazole.

Examples of compounds of the formula IV are:
IV. 1. 2-Ethyl-2'-ethoxy-,
IV. 2. 2-Ethyl-2'-ethoxy-5'-tert.butyl-,
IV. 3. 2-Ethyl-4-tert.-butyl-2'-ethoxy-5'-tert.-butyl-,
IV. 4. 2,2'-Dimethoxy-,
IV. 5. 2,2'-Diethoxy-,
IV. 6. 4,4'-Dimethoxy-,
IV. 7. 4,4'-Diethoxy-,
IV. 8. 2,4'-Dimethoxy-,
IV. 9. 2,4'-Diethoxy-,
IV. 10. 2-Methoxy-2'-ethoxy-,
IV. 11. 2-Methoxy-4'-ethoxy-,
IV. 12. 2-Ethoxy-4'-methoxy-,
IV. 13. 2,2'-Dioctoxy-5,5'-di-tert.-butyl,
IV. 14. 2,2'-Didodecyloxy-5,5'-di-tert.-butyl-,
IV. 15. 2-Ethyl-2'-octoxy-,
IV. 16. 4,4'-Di-octoxy-,
IV. 17. 2-Ethyl-2'-butoxy- and
IV. 18. 4-Methyl-4'-methoxy-oxalanilide.

Examples of compounds of the formula V are:
V. 1. Salicylic acid phenyl ester.
V. 2. Salicylic acid 4-tert.-butylphenyl ester.
V. 3. Salicylic acid 4-tert.-octylphenyl ester.

Examples of compounds of the formula VI are:
VI. 1. α-Cyano-β-methyl-4-methoxycinnamic acid methyl ester.
VI. 2. α-Cyano-β-methyl-4-methoxycinnamic acid butyl ester.
VI. 3. α-Cyano-62-phenyl-cinnamic acid ethyl ester.
VI. 4. α-Cyano-β-phenyl-cinnamic acid isooctyl ester.

Examples of compounds of the formula VII are:
VII. 1. 4-Methoxy-benzylidenemalonic acid dimethyl ester.
VII. 2. 4-Methoxy-benzylidenemalonic acid diethyl ester.
VII. 3. 4-Butoxy-benzylidenemalonic acid dimethyl ester.

Examples of compounds of the formula VIII are:
VIII. 1. N-(β-Cyano-β-carbomethoxyvinyl)-2-methylindoline.
VIII. 2. N-(β-Cyano-β-carbooctoxyvinyl)-2-methylindoline.
VIII. 3. N-(β-Cyano-β-carbethoxyvinyl)-2-methylindoline.
VII. 4. N-(β-Cyano-β-carboisooctoxyvinyl)-2-methylindoline.

Stabiliser systems which have proved particularly advantageous are those which consist of
(a) at least one sterically hindered cyclic amine of the formula

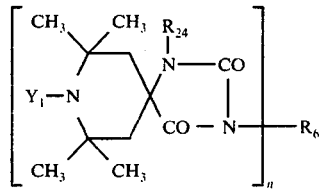

in which $Y_1$ denotes hydrogen, —O· or methyl, $R_6$ denotes alkyl with 1-12 carbon atoms, allyl, benzyl, cyclohexyl, glycidyl, hydroxyethyl, alkoxyalkyl with 3-10 carbon atoms, alkoxycarbonylalkyl with 3-14 carbon atoms, hexamethylene or 3-oxapentamethylene, $R_{24}$ denotes hydrogen, methyl, ethyl or benzyl, and $n$ denotes 1 or 2, and
(b) 2-(2'-hydroxy-5'-methylphenyl)-benztriazole as the costabiliser,
or those which consist of
(a) at least one sterically hindered cyclic amine of the formula

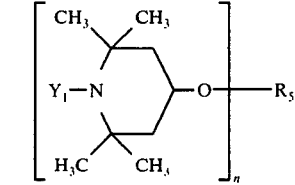

in which $Y_1$ denotes hydrogen, —O· or methyl, $R_5$ denotes an acyl group which is derived from an aliphatic carboxylic acid with 1-18 carbon atoms, from acrylic acid or methacrylic acid, from a benzoic acid with 7-11 carbon atoms, from salicyclic acid, from an aliphatic dicarboxylic acid with 6-14 carbon atoms, from terephthalic acid, from isophthalic acid, from β-(3,5-di-tert.-butyl-4-hydroxyphenyl)-propionic acid or from 3,5-di-tert.-butyl-4-hydroxy-benzoic acid and $n$ denotes 1 or 2, and (b) 2-(2'-hydroxy-5'-methylphenyl)-benztriazole as the costabiliser.

The new stabiliser systems according to the invention make it possible effectively to protect styrene polymers, especially styrene co-polymers such as, for example, ABS plastics, against the harmful influence of UV radiation, heat and oxygen, without discolouration of the styrene polymers stabilised therewith. Furthermore, plastics stabilised therewith can be re-shaped by all customary methods of processing and do not require any after-treatment involving the application of protective top coats.

Possible substrates for the new stabiliser systems are: polystyrene and impact-resistant polystyrenes modified with elastomers, styrene copolymers such as, for example, styrene-acrylonitrile copolymers and copolymers which contain additional copolymerisable monomers, such as, for example styrene-acrylonitrile-methyl methacrylate copolymers, styrene-acrylonitrile-butadiene copolymers, styrene-acrylonitrile-acrylic ester copolymers, styrene-acrylonitrile copolymers modified with acrylic ester polymers to render them impact-resistant, and styrene polymers modified with EPDM (ethylene-propylene-diene monomer) to render them impact-resistant. In the said polymers, styrene can be wholly or partially replaced by α-methylstyrene. The new stabiliser systems are particularly valuable for stabilising styrene-acrylonitrile-butadiene co-polymers, which are generally described as ABS plastics and which are described in detail in the book "ABS Resin Manufacture 1970" by C. Placek, Noyes Data Corporation, N.J. Numerous processes are known for the manufacture of the abovementioned styrene polymers, such as, for example, bulk polymerisation, and polymerisation in solution, emulsion or suspension, it being possible to combine several of these processes. The new stabiliser systems can be incorporated during one of the various process steps, depending on the process chosen, such as, for example, polymersiation, working up or compounding. If, for example, the polymerisation is carried out by the emulsion process, the stabiliser systems can be added, in a suitably formulated emulsion or suspension, by themselves or together with other additives, before precipitating the latex. The various components of the new stabiliser systems can also be added at different points in time during the manufacture of styrene polymers. The new stabiliser systems can also be added, for example, by dry mixing with the polymers to be stabilised, before granulation. If the styrene polymers are already in the form of granules, the stabiliser systems can be added by dry mixing, before conversion into finished articles.

The weight ratio of the compounds of the formula I to the compounds of the formulae II–VIII in the new stabiliser system can vary within wide limits of, for example, 1:10 to 10:1. Preferably, this ratio varies within the limits of 2:1 to 1:2. A weight ratio of 1:1 is particularly preferred.

The new stabiliser systems are added to the carrier materials in a concentration of 0.1–5% by weight, based on the carrier material. Preferably, 0.5–4%, and particularly preferentially 0.5–2.5%, are added.

Further possible additives which are added, conjointly with the new stabiliser systems, to the styrene polymers, are: antistatic agents, lubricants, pigments, flameproofing agents, blowing agents, fillers and antioxidants, preferably phenolic antioxidants.

The manufacture of most of the compounds of the formula I-VIII is known from the literature.

Compounds of the formula I can be manufactured according to F. Asinger, Monatshefte 99, 1436–1451 (1968). German Offenlegungsschriften Nos. 2,040,975, 2,118,298, 2,128,757, 2,146,692 and 2,203,447, U.S. Pat. Nos. 3,513,170, 3,639,409, 3,640,928 and 3,663,558, British Pat. Nos. 1,196,958, 1,202,299 and 1,262,234, Belgian Pat. Nos. 778,381 and 778,676 and Japanese Pat. No. 600,043.

Further compounds of the formula I can be manufactured as follows:

Compounds of the general formula

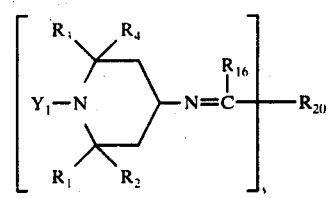

by condensation of the corresponding 4-aminopiperidines with aldehydes or ketones, according to known methods;

compounds of the general formula

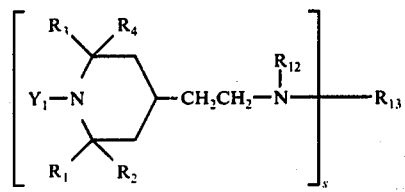

by condensation of the corresponding 4-piperidinones with cyanoacetic acid or its esters by the Knoevenagel method, decarboxylation, catalytic hydrogenation of the unsaturated nitrile and alkylation or acylation of the resulting primary amine;

compounds of the general formula

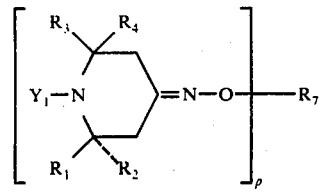

by oximation of the corresponding 4-piperidinones and optionally subsequent alkylation or acylation according to known methods;

compounds of the general formulae

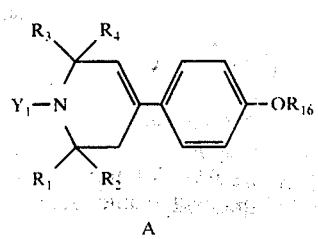

A

-continued

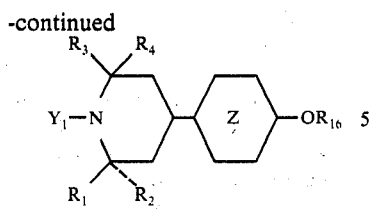

by condensation of the corresponding 4-piperidinones with phenols in the presence of acid catalysts to give compounds of the formula A and subsequent catalytic hydrogenation to give compounds of the formula B;

compounds of the general formulae

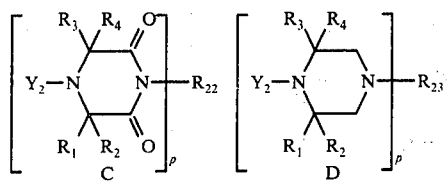

by condensation of the corresponding aminocyanohydrins according to R. Sudo, Bull. Chem. Soc. Japan 36, 34 (1963), subsequent hydrolysis according to E. F. J. Duynstee, Rec. 87, 945 (1968) and optional alkylation to give compounds of the formula C which can in turn be reduced with lithium aluminium hydride to give compounds of the formula D.

The compounds of the formulae II-VIII can be manufactured according to U.S. Pat. Nos. 3,006,959 and 3,043,797, Swiss Pat. No. 355,947, British Pat. No. 1,177,095, French Pat. No. 1,318,102, German Auslegeschrift 1,087,902 and Netherlands Patent Application 67/08,332.

The invention is explained in more detail in the examples which follow. In these, parts denote parts by weight.

EXAMPLE 1

1,000 parts of ABS granules (Dow 500) containing 2 parts of 2,6-di-tert.-butyl-p-cresol and 2 parts of tris-nonylphenyl phosphite for basic stabilisation, are mixed in a drum mixer with 10 parts, or 5 + 5 parts in the case of the synergistic mixtures, of the light protection agents listed in the table which follows, and the mixture is then extruded in an extruder at a maximum temperature of 220° C. to give granules. The resulting granules are injection-moulded in an injection moulding machine to give a 2-3 mm thick sheet. A part of the resulting crude moulding is cut out and pressed between two high gloss hard aluminium foils for 6 minutes at 180° C. and 4/ tons pressure, in a manually operated hydraulic laboratory press, to give an 0.130 mm thick film which is immediately chilled in cold water. Portions each of size 60 × 44 mm are now punched from this film and exposed in the Atlas Weather-o-meter. At regular intervals of time, these test specimens are taken out of the light exposure apparatus and tested for their carbonyl content in an IR spectrophotometer. The increase in the carbonyl extinction on exposure is a measure of the photo-oxidative degradation of the polymers [J. Shimada and K. Kabuki, J. Amer. Polym. Soc. 12, 655-669 and 671-682 (1968)] and it is known from experience that this is related to a deterioration in the mechanical properties of the polymers.

Table 1 which follows gives the exposure times after which a carbonyl extinction (5.85μ) of 0.300 has been reached. The synergistic action of the stabiliser systems according to the invention can be seen clearly from these times.

Table 1

| Substance No. | | Hours of exposure in the Atlas Weather-o-meter to reach a CO extinction of 0.300. |
|---|---|---|
| No light protection agent | | 110 |
| 10 parts of | I.11. | 330 |
| 10 parts of | I.25. | 200 |
| 10 parts of | I.57. | 155 |
| 10 parts of | III.1. | 300 |
| 10 parts of | II.2. | 350 |
| 10 parts of | IV.1. | 270 |
| 5 parts of | I.11. | |
| + 5 parts of | III.1. | >500 |
| 5 parts of | I.11. | |
| + 5 parts of | II.2. | >500 |
| 5 parts of | I.25. | |
| + 5 parts of | III.1. | >500 |
| 5 parts of | I.25. | |
| + 5 parts of | II.2. | >450 |
| 5 parts of | I.57. | |
| + 5 parts of | III.1. | 380 |
| 5 parts of | I.11. | |
| + 5 parts of | IV.1. | >500 |
| 5 parts of | I.25. | |
| + 5 parts of | IV.1. | >400 |

EXAMPLE 2

1,000 parts of ABS granules (Dow 500) containing 2 parts of 2,6-di-tert.-butyl-p-cresol and 2 parts of tris-nonylphenyl phosphite for basic stabilisation, are mixed in a drum mixer with 10 parts, or 5 + 5 parts in the case of the synergistic mixtures, of the light protection agents listed in the table which follows, and the mixture is then extruded in an extruder at a maximum temperature of 220° C. to give granules. The granules obtained are injection-moulded in an injection moulding machine to give 2 mm thick, 6.8 mm wide and 60 mm long bars. These test specimens are exposed in an Atlas Weather-o-meter. At regular intervals of time, the test specimens are taken out of the exposure apparatus and their impact strength is measured by means of a pendulum impact tester. Table 2 which follows provides information on the data obtained and shows the clear synergistic action of the stabiliser systems claimed.

Table 2

| Substance No. | | Hours of exposure in the Atlas Weather-o-meter to reach an impact strength of 10 kpcm/cm² |
|---|---|---|
| No light protection agent | | 95 |
| 10 parts of | I.11. | 320 |
| 10 parts of | I.25. | 165 |
| 10 parts of | III.1. | 180 |
| 10 parts of | II.2. | 160 |
| 10 parts of | IV.1. | 160 |
| 5 parts of | I.11. | |
| + 5 parts of | III.1. | 400 |
| 5 parts of | I.11. | |
| + 5 parts of | II.2. | 400 |
| 5 parts of | I.11. | |
| + 5 parts of | IV.1. | 390 |
| 5 parts of | I.25. | |
| + 5 parts of | III.1. | 350 |
| 5 parts of | I.25. | |
| + 5 parts of | II.2. | 320 |
| 5 parts of | I.25. | |
| + 5 parts of | IV.1. | 250 |

EXAMPLE 3

The procedure followed is analogous to Example 1. Instead of sheets, bars 4 mm thick, 6 mm wide and 50 mm long are injection-moulded (standard small bars according to DIN 53,454).

These test specimens are exposed in a Xenotest 450. At regular intervals of time, the test specimens are taken out of the exposure apparatus and their impact strength is tested by means of a pendulum impact tester.

The harm to the test specimens caused by the exposure manifests itself by a decrease in the impact strength figures.

Table 3 shows the exposure times after which the impact strength figures of the particular formulations have fallen to 20 kpcm/cm$^2$ and thus shows the unambiguous synergistic action of the stabiliser systems claimed.

| Substance No. | | Hours of exposure in the Xenotest 450 until the impact strength has decreased to 20 kpcm/cm$^2$ |
|---|---|---|
| No light protection agent | | 200 |
| 10 parts of | III.1. | 380 |
| 10 parts of | I.11. | 680 |
| 10 parts of | I.1. | 460 |
| 10 parts of | I.25. | 580 |
| 10 parts of | I.14. | 690 |
| 5 parts of | I.11 | |
| + 5 parts of | III.1. | 1,250 |
| 5 parts of | I.1. | |
| + 5 parts of | III.1. | 820 |
| 5 parts of | I.25. | |
| + 5 parts of | III.1. | 840 |
| 5 parts of | I.14. | |
| + 5 parts of | III.1. | 1,300 |

1,000 parts of impact-resistant polystyrene granules are mixed in a drum mixer with 3 parts, or 1.5 + 1.5 parts in the case of synergistic mixtures, of the light protection agents listed in Table 4, and the mixture is then extruded in an extruder at a maximum temperature of 220° C., and granulated. The granules obtained are injection-moulded in an injection moulding machine to give sheets of size 50 × 55 × 2 mm. These test specimens are exposed in a Xenotest 450. The deterioration caused by the exposure manifests itself in the yellowing of the material. To assess the degree of yellowing, the Yellowness Index according to ASTM D1925/6-3T is measured.

Table 4 which follows indicates the increase (ΔYI) of the Yellowness Index of the particular sample after 1,750 hours' exposure in the Xenotest 450 and thus shows the unambiguous synergistic action of the stabiliser systems claimed.

Table 4

| Substance No. | | Increase in Yellowness Index (ΔYI) after 1,750 hours' exposure in the Xenotest 450 |
|---|---|---|
| No light protection agent | | 30.1 |
| 3 parts of | III.1. | 19.8 |
| 3 parts of | I.11. | 9.3 |
| 3 parts of | I.25. | 12.1 |
| 3 parts of | I.1. | 12.5 |
| 3 parts of | I.57. | 20.4 |
| 1.5 parts of | III.1. | |
| + 1.5 parts of | I.11. | 6.6 |
| 1.5 parts of | III.1. | |
| + 1.5 parts of | I.25. | 6.8 |
| 1.5 parts of | III.1. | |
| + 1.5 parts of | I.1. | 6.0 |
| 1.5 parts of | III.1. | |
| + 1.5 parts of | I.57. | 10.2 |

What we claim is:

1. A stabilized composition consisting essentially of
   (a) An acrylonitrile-butadiene-styrene resin;
   (b) A sterically hindered cyclic amine selected from the group consisting of bis-(1,2,2,6,6,-pentamethyl-4-piperidyl)-sebacate and bis-(2,2,6,6-tetramethyl-4-piperidyl)-suberate; and
   (c) 2-(2'-hydroxy-5'-methylphenyl)-benztriazole as a co-stabilizer; the ratio of the cyclic amine to the co-stabilizer being from 1:10 to 10:1.

* * * * *